United States Patent
Tsror

(10) Patent No.: US 10,243,868 B1
(45) Date of Patent: Mar. 26, 2019

(54) RATE LIMITERS AND METHODS FOR RATE LIMITING ACCESS TO A RESOURCE

(71) Applicant: Marvell Israel (M.I.S.L) Ltd., Yokneam (IL)

(72) Inventor: Ariel Tsror, Karmiel (IL)

(73) Assignee: Marvell Israel (M.I.S.L) Ltd, Yokneam (IL)

( * ) Notice: Subject to any disclaimer, the term of this patent is extended or adjusted under 35 U.S.C. 154(b) by 205 days.

(21) Appl. No.: 15/208,831

(22) Filed: Jul. 13, 2016

Related U.S. Application Data

(60) Provisional application No. 62/191,655, filed on Jul. 13, 2015.

(51) Int. Cl.
| | |
|---|---|
| *H04L 12/911* | (2013.01) |
| *H04L 12/801* | (2013.01) |
| *H04L 12/819* | (2013.01) |
| *H04L 12/873* | (2013.01) |
| *G06F 15/173* | (2006.01) |
| *H04L 12/54* | (2013.01) |

(52) U.S. Cl.
CPC ...... *H04L 47/527* (2013.01); *G06F 15/17331* (2013.01); *H04L 47/781* (2013.01); *H04L 12/56* (2013.01); *H04L 47/10* (2013.01); *H04L 47/215* (2013.01); *H04L 47/70* (2013.01)

(58) Field of Classification Search
CPC ... H04L 9/3213; H04L 147/10; H04L 47/215; H04L 47/39; H04L 47/70; H04L 12/56
See application file for complete search history.

(56) References Cited

U.S. PATENT DOCUMENTS

2008/0186884 A1* 8/2008 Ahn ............... H04L 47/781
370/310

* cited by examiner

*Primary Examiner* — Tom Y Chang

(57) ABSTRACT

A network device and method of constraining a client's access to a packet memory of a network device are provided. A packet memory is configured to store packets, and a client is configured to access the packet memory based on the client receiving a credit. A rate limiter is configured to grant credits to the client according to a configurable threshold. The configurable threshold comprises a sum of an integer component and a fraction component, and the sum defines an average rate at which the credits are granted to the client by the rate limiter. A network port is configured to receive packets from the client.

11 Claims, 5 Drawing Sheets

IterCntr

| | 7 | 6 | 5 | 4 | 3 | 2 | 1 | 0 |
|---|---|---|---|---|---|---|---|---|
| 0 | 0 | 0 | 0 | 0 | 0 | 0 | 0 | 0 |
| 1 | 1 | 0 | 0 | 0 | 0 | 0 | 0 | 0 |
| 2 | 1 | 0 | 0 | 0 | 1 | 0 | 0 | 0 |
| 3 | 1 | 0 | 1 | 0 | 0 | 1 | 0 | 0 |
| 4 | 1 | 0 | 1 | 0 | 1 | 0 | 1 | 0 |
| 5 | 1 | 1 | 0 | 1 | 1 | 0 | 1 | 0 |
| 6 | 1 | 1 | 1 | 0 | 1 | 1 | 1 | 0 |
| 7 | 1 | 1 | 1 | 1 | 1 | 1 | 1 | 0 |

FIG. 3

RATE LIMITERS AND METHODS FOR RATE LIMITING ACCESS TO A RESOURCE

CROSS-REFERENCE TO RELATED APPLICATIONS

This application claims priority to U.S. Provisional Patent Application No. 62/191,655, filed Jul. 13, 2015, entitled "High Resolution Rate Limiter," which is incorporated herein by reference in its entirety.

FIELD

The present disclosure relates generally to rate limiters and methods of constraining a client's rate of access to a resource. Embodiments of the technology described herein relate to systems and methods for constraining access to a resource in a communication device.

BACKGROUND

Rate limiters are used in a variety of different systems and devices (e.g., computing systems, network devices, etc.) to constrain the rate at which one or more clients are permitted to utilize a resource. For example, in a computer system, multiple processors often share a hardware resource (e.g., a memory, an input/output port, etc.). To ensure that each of the multiple processors is able to utilize the shared resource, a rate limiter may be used to rate limit the processors' access to the resource. For instance, each processor may be given access to the shared resource once every N clock cycles.

The description above is presented as a general overview of related art in this field and should not be construed as an admission that any of the information it contains constitutes prior art against the present patent application.

SUMMARY

Examples of a network device, apparatus, and method of constraining a client's access to a packet memory of a network device are provided. An example network device includes a packet memory configured to store packets. The network device also includes a client configured to access the packet memory based on the client receiving a credit. A rate limiter is configured to grant credits to the client according to a configurable threshold. The configurable threshold comprises a sum of an integer component and a fraction component, and the sum defines an average rate at which the credits are granted to the client by the rate limiter. The network device also includes a network port configured to receive packets from the client.

An example apparatus includes a client that is configured to access or utilize a resource based on the client receiving a credit. The apparatus also includes a rate limiter configured to grant credits to the client according to a configurable threshold. The configurable threshold comprises a sum of an integer component and a fraction component, where the sum defines an average rate at which the credits are granted to the client by the rate limiter.

In an example method of constraining a client's access to a packet memory of a network device, one or more requests to access a packet memory of a network device are received from a client. The client is configured to access the packet memory based on its receipt of a credit. Responsive to the one or more requests, credits are granted to the client according to a configurable threshold. The configurable threshold comprises a sum of an integer component and a fraction component, where the sum defines an average rate at which the credits are granted to the client.

BRIEF DESCRIPTION OF THE DRAWINGS

FIG. 3 illustrates an example data structure utilized by the rate limiter of FIG. 1 according to an embodiment of the present disclosure.

DETAILED DESCRIPTION

The present disclosure relates generally to rate limiters and methods of constraining a client's rate of access to a resource. In embodiments described below, the resource is a memory (e.g., a packet memory), but in other embodiments, the resource is a processor (e.g., a CPU), input/output device, port, or another type of resource. Further, in embodiments described below, the client is a write client, a read client, a processor, a stage in a packet processing pipeline, or another type of client. More particularly, embodiments of the present disclosure provide systems and methods for rate limiting a client's access to a packet memory of a network device. Merely by way of example, embodiments of the present disclosure provide a rate limiter for a network device with a configurable threshold, where the configurable threshold includes a sum of an integer component and a fraction component. It is noted that the present disclosure has a much broader range of applicability than the particular embodiments described herein, and that the systems and methods of the present disclosure may be used to provide rate limiting in a wide variety of devices and systems (e.g., computer systems, network devices, computer networks, etc.).

Figure 1:
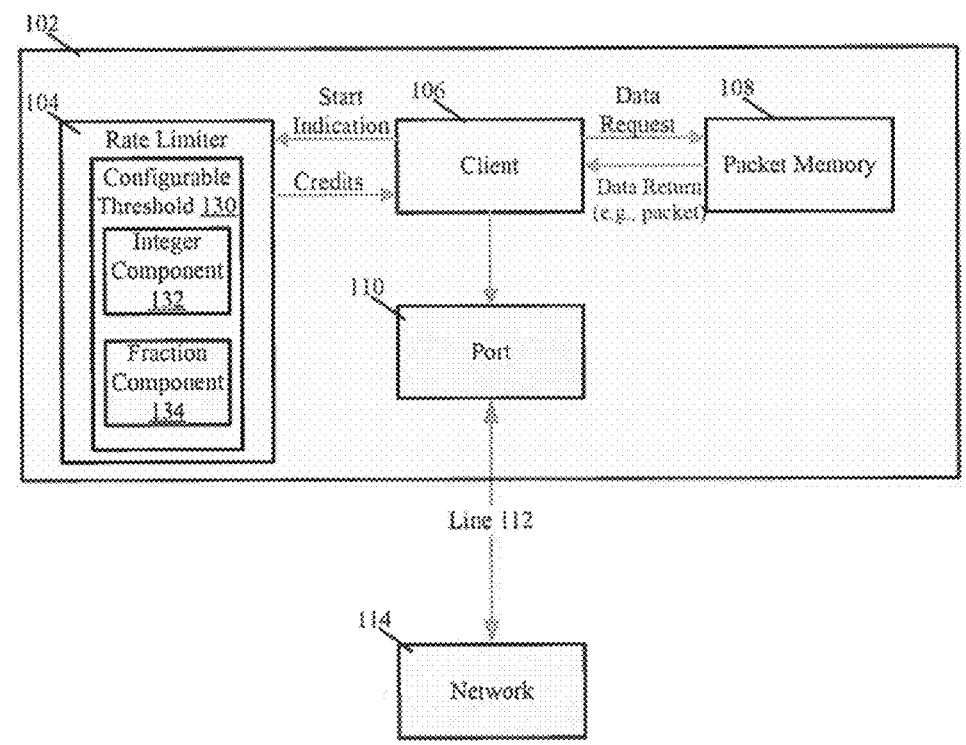
FIG. 1 is a simplified illustration of a network device according to an embodiment of the present disclosure.

FIG. 1 is a simplified illustration of a network device 102 according to an embodiment of the present disclosure. As illustrated in FIG. 1, the network device 102, which may be a network switching or routing device, for example, includes a packet memory 108. The packet memory 108 is configured to store packets, including packets received at the network device 102 via a network 114 (e.g., an Ethernet network) to which the network device 102 is coupled. In embodiments, a write client of the network device 102 (e.g., an ingress port, a direct memory access (DMA) associated with an ingress port, etc.) writes incoming packets to the packet memory 108. The network device 102 further includes a read client 106 that is configured to read from the packet memory 108. In embodiments, the client 106 is a DMA associated with an egress port (e.g., port 110 depicted in FIG. 1 and described in further detail below) that reads stored packets from the packet memory 108 in response to the DMA's receipt of a credit from a rate limiter 104. In embodiments, the packet memory 108 can receive a packet at a specific rate from an ingress port, while it can simultaneously be read from an egress port of the same rate. The rate limiter 104 is responsible for preventing read before write from the packet memory 108.

In particular, in embodiments, the client 106 indicates to the rate limiter 104 that the client 106 would like to begin reading packets from the packet memory 108. This is shown in FIG. 1, which shows a "Start Indication" transmitted from the client 106 to the rate limiter 104. In response to this indication from the client 106, the rate limiter 104 grants credits (e.g., tokens) to the client 106 according to a configurable threshold. As referred to herein, a "credit" is an indication (e.g., a signal, data, message, etc.) provided from the rate limiter 104 to the client 106, which, upon being received by the client 106, enables the client 106 to access (e.g., read from) the packet memory 108. The rate limiter's granting of credits to the client 106 is shown in FIG. 1, which shows "Credits" being transmitted from the rate limiter 104 to the client 106. The configurable threshold utilized by the rate limiter 104 is described in further detail herein.

In embodiments, the client 106 reads from the packet memory 108 each time that the client 106 receives a credit from the rate limiter 104. The client's reading of data (e.g., packets) from the packet memory 108 is shown in FIG. 1, which shows the client 106 transmitting a "Data Request" to the packet memory 108, and the packet memory 108 responding to the Data Requests by transmitting a "Data Return" to the client 106. Subsequently, the client 106 forwards the received data to a port 110 (e.g., Ethernet port) of the network device 102. In some embodiments, a packet is stored in a memory of the network device 102 that is shared by several clients, e.g., ports, while header information for the packet is concurrently processed and a decision is made regarding what to do with the packet. At the end of processing and when it is time to transmit a packet, prior to the packet being transmitted at a selected egress port based on a processing decision, a read client (e.g., the selected egress port, a DMA associated with the selected egress port, etc.) reads the packet from the shared packet memory where the packet has been stored. In embodiments, the read client is permitted to read the packet from the shared packet memory based on the read client's receipt of a credit from the rate limiter 104. In the example of FIG. 1, the port 110 is an egress network port connected to the network 114 via a line 112 (e.g., Ethernet line), thus enabling the data received from the client 106 to be transmitted via the network 114. In embodiments, the port 110 is a 1 Gb Ethernet (GE) port, a 10 Gb Ethernet (XG) port, a MAC port, or another type of port on a network device.

It is noted that the simplified illustration provided in FIG. 1 omits various elements for purposes of clarity and to avoid obfuscating teachings of the current disclosure. The omitted elements include, in embodiments, a packet processor, a CPU, various queues (e.g., hardware and/or software queues), and memories other than the packet memory 108, among other elements. Accordingly, embodiments of the present disclosure are not limited to the illustration shown in FIG. 1 but include elements that are added, removed, combined, or separated.

According to embodiments of the present disclosure, one or more mechanisms are provided within the network device 102 for limiting a rate at which the client 106 is able to read packets from the packet memory 108. These mechanisms differ from conventional techniques for performing rate limiting. For instance, in the conventional techniques, a rate limiter utilizes a threshold that is an integer number. The threshold utilized by the rate limiter defines the rate at which credits are granted to the client by the rate limiter. Specifically, in systems that use the conventional techniques, the rate limiter grants the client one credit every Thr_conv clock cycles, where Thr_conv is the integer threshold used by the rate limiter in the conventional techniques. With this threshold, the rate at which credits are granted to the client is equal to (1 credit/Thr_conv clock cycles). For instance, in accordance with the conventional techniques, the rate limiter may utilize an integer threshold Thr_conv that is equal to 6 clock cycles and thus grant a single credit to the client every 6 clock cycles. Accordingly, the rate at which credits are granted to the client in this example is (1 credit/6 clock cycles).

The conventional techniques' use of the integer threshold Thr_conv is deficient because a difference between the threshold Thr_conv utilized by the rate limiter and an ideal threshold is often relatively large. Rounding up will cause reading to be too slow, hence suffering from an underrun problem, as described in further detail below. Rounding down will cause reading to be too fast, hence increasing the probability of a read-before-write problem. The ideal threshold defines a rate at which a client should read from the packet memory in order to achieve a desired transmission rate at an egress port. For example, consider an example in which an egress port has a transmission rate of 10G. In this example, if the client reads from the packet memory at a rate of (1 packet/IdealThr clock cycles), where IdealThr is the ideal threshold, this will enable the egress port to transmit at the desired rate of exactly 10G. Thus, for instance, if a packet memory width is 1024b, for a given clock frequency in MHz and a given port rate in Mbps, the following is true:

PortSpeed[Mbps]=1024[b]*Clock[Mhz]/IdealThr [Cycles], such that IdealThr [Cycles]=1024*Clock[Mhz]/PortSpeed [Mbps].

As noted above, the conventional techniques' use of the integer threshold Thr_conv is deficient because a difference between the threshold Thr_conv utilized by the rate limiter and an ideal threshold is often relatively large. For instance, in an example system, an ideal threshold for granting credits to the client is 5.55 clock cycles. Because the threshold Thr_conv utilized by the rate limiter in the conventional techniques is limited to integer values, the rate limiter may utilize, for instance, a threshold Thr_conv equal to 5 clock cycles. The difference between the threshold Thr_conv of 5 clock cycles and the ideal threshold of 5.55 clock cycles is relatively large, and the rate limiter thus grants credits to the client at a rate that is much higher than desired. Accordingly, it can be seen that in the conventional techniques, a resolution at which the threshold Thr_conv can be set is relatively low, as the threshold Thr_conv can only take on integer values. This results in the relatively large differences between the threshold Thr_conv and the ideal threshold, as described above.

In contrast to these conventional techniques, embodiments of the present disclosure provide the rate limiter 104 with a configurable threshold 130 that includes (i) an integer component 132, and (ii) a fraction component 134. Specifically, in embodiments described herein, the rate limiter 104 grants credits to the client 106 according to the configurable threshold 130 equal to $$\left(Thr + \frac{A}{R}\right).$$

where Thr is the integer component 132 of the configurable threshold 130, and (A/R) is the fraction component 134 of the configurable threshold 130. In embodiments, each of the values Thr, A, and R is a configurable value that can be varied (e.g., by a user, via an algorithmic process implemented in software and/or hardware, etc.).

The rate limiter's use of the configurable threshold 130 comprising the sum of the integer component Thr and the fraction component (A/R) enables the threshold (i) to be equal to an ideal threshold, or (ii) to closely approximate the ideal threshold. For instance, consider the example described above, where the ideal threshold for granting credits to the client 106 is equal to 5.55 clock cycles. Through appropriate selection of the configurable values Thr, A, and R, as described in further detail below, the threshold utilized by the rate limiter 104 can be set equal to the ideal threshold or can closely approximate the ideal threshold. For instance, the integer component Thr can be set equal to 5, A can be set equal to 4, and R can be set equal to 8, thus resulting in the following threshold utilized by the rate limiter 104:

$$\left(5 + \frac{4}{8}\right) = 5.50 \text{ clock cycles}$$

With the values Thr, A, and R set as described above, the resulting threshold of 5.50 clock cycles closely approximates the ideal threshold of 5.55 clock cycles.

Further, in embodiments, the difference between the threshold utilized by the rate limiter 104 and the ideal threshold can be reduced by increasing the value R. In embodiments, R is a configurable value that defines a resolution at which the threshold can be set. Thus, for instance, in the example described above, if the resolution R is increased from the value of 8 to a value of 20, and values for Thr and A are chosen appropriately, the threshold utilized by the rate limiter 104 can be set equal to the ideal threshold of 5.55 clock cycles:

$$\left(5 + \frac{11}{20}\right) = 5.55 \text{ clock cycles}$$

In embodiments, the resolution R of the rate limiter 104 is set by the rate limiter 104 according to an automatic, algorithmic process that requires no human intervention or minimal human intervention. In other embodiments, a human user manually sets the resolution R of the rate limiter 104.

In embodiments, the rate limiter 104 grants credits to the client 106 according to the configurable threshold (Thr+(A/R)), and for a given resolution R, the values Thr and A are selected to satisfy $$Thr + \frac{A}{R} \leq IdealThr < Thr + \frac{A+1}{R},$$

where A<R, and IdealThr is the ideal threshold for granting credits to the client 106. It is noted that in embodiments, the rate limiter 104 determines the values Thr and A to satisfy the above expression according to an automatic, algorithmic process that requires no human intervention or minimal human intervention. In other embodiments, a human user manually selects the values Thr and A. Setting the configurable threshold (Thr+(A/R)) in a manner that satisfies the above expression ensures (i) that a difference between the configurable threshold and the ideal threshold is as small as possible for a given resolution R, and (ii) that the configurable threshold is always less than or equal to the ideal threshold. As described below, in embodiments, setting the configurable threshold to be less than or equal to the ideal threshold ensures that an "underrun" condition does not occur in the network device 102. Underrun conditions are described in further detail below.

The configurable threshold (Thr+(A/R)) defines an average rate at which the rate limiter 104 grants credits to the client 106. For instance, in the above example where Thr=5, A=4, and R=8, the configurable threshold is equal to 5.50 clock cycles, such that an average rate at which credits are granted to the client 106 by the rate limiter 104 is equal to (1 credit/5.50 clock cycles). By ensuring that the configurable threshold is less than or equal to the ideal threshold, as described above, this ensures that the client 106 receives credits from the rate limiter 104 at an average rate that is never less than an ideal rate. The ideal rate is inversely proportional to the above-described ideal threshold IdealThr, and in embodiments, the ideal rate is equal to (1/IdealThr). In embodiments, this helps to prevent an underrun condition. Specifically, as described above, in embodiments, the client 106 is a DMA that (i) reads data from the packet memory 108 upon receiving a credit from the rate limiter 104, and (ii) then sends the data to the port 110 for transmission via the line 112. In embodiments, the network device 102 constantly transmits data via the port 110. If no valid data from the client 106 is present at the port 110 for transmission, the network device 102 may transmit invalid data (e.g., garbage). This situation is known as an underrun condition. An underrun condition can occur, for example, in the context of cut-through processing, where the network device 102 makes a forwarding decision based on a received header, but before an entire packet payload is received at the network device 102. This means that there may be a situation in which an ingress port of the network device 102 is still in a mode for writing a packet to the packet memory 108, while the egress port 110 already needs to transmit the packet. If the egress port 110 is starved (i.e., the data is not yet available to be retrieved by the egress port 110, although the egress port 110 needs to retrieve the data), this is an example of an underrun condition. Accordingly, to prevent occurrence of an underrun condition, the client 106 should be able to read data from the packet memory 108 at a rate that is equal to or higher than the ideal rate and never less than the ideal rate. This ensures that the client 106 will receive data at a rate that is sufficient to prevent instances of the port 110 having no valid data from the client 106.

The values Thr, R, and A of the configurable threshold (Thr+(A/R)) instruct the rate limiter 104 as to how credits should be granted to the client 106 in order to achieve the average rate defined by the configurable threshold. In embodiments, the rate limiter 104 grants credits to the client 106 in repeatable sequences, and the value R specifies a number of credits that are granted to the client 106 during a single sequence. The integer value Thr defines first and second rates at which credits are granted to the client 106 by the rate limiter 104 during the sequence. The values R and A define (i) a number of credits of the R credits granted during the sequence that are granted at the first rate, and (ii) a number of credits of the R credits granted during the sequence that are granted at the second rate.

Specifically, in embodiments, (R−A) (i.e., R minus A) credits of the R credits granted during the sequence are granted at a first rate that is equal to (1 credit/Thr clock cycles), and A credits of the R credits granted during the sequence are granted at a second rate that is equal to (1 credit/(Thr+1) clock cycles). In utilizing the different first and second rates to grant the R credits of the sequence, the average rate defined by the configurable threshold (Thr+(A/R)) is achieved. To illustrate an example of this, consider the following configurable threshold utilized by the rate limiter 104:

$$\left(1 + \frac{2}{8}\right) = 1.25 \text{ clock cycles}$$

Thus, in this example, Thr=1, A=2, and R=8. With these values, the rate limiter 104 grants credits in repeatable sequences, where R=8 credits are granted by the rate limiter 104 during a sequence. Further, during the sequence, the rate limiter 104 grants (R−A) (i.e., 6) of the 8 credits at a first rate that is equal to (1 credit/Thr clock cycles), where Thr=1 clock cycle. In other words, in granting these 6 credits, the rate limiter 104 counts a single clock cycle (i.e., Thr=1) and then grants one credit to the client 106. During the sequence, the rate limiter 104 grants A (i.e., 2) of the 8 credits at a second rate that is equal to (1 credit/(Thr+1) clock cycles), where Thr+1=2 clock cycles. In other words, in granting these 2 credits, the rate limiter 104 counts two clock cycles (i.e., Thr+1) and then grants one credit to the client 106.

From the above description, it is seen that during the sequence, 6 clock cycles elapse in granting the 6 credits at the first rate (i.e., each of the 6 credits is granted after a single clock cycle elapses), and 4 clock cycles elapse in granting the 2 credits at the second rate (i.e., each of the 2 credits is granted after two clock cycles elapse). Accordingly, in the sequence, the rate limiter 104 grants the R=8 credits over the course of 10 clock cycles, such that the average rate of (1 credit/1.25 clock cycles) is met. After granting the R=8 credits in the first sequence, a second sequence begins, and another R=8 credits are granted in a similar manner. The repeatable sequences can continue as long as desired, and in each sequence, the R credits are granted at the average rate of (1 credit/1.25 clock cycles).

Figure 2:
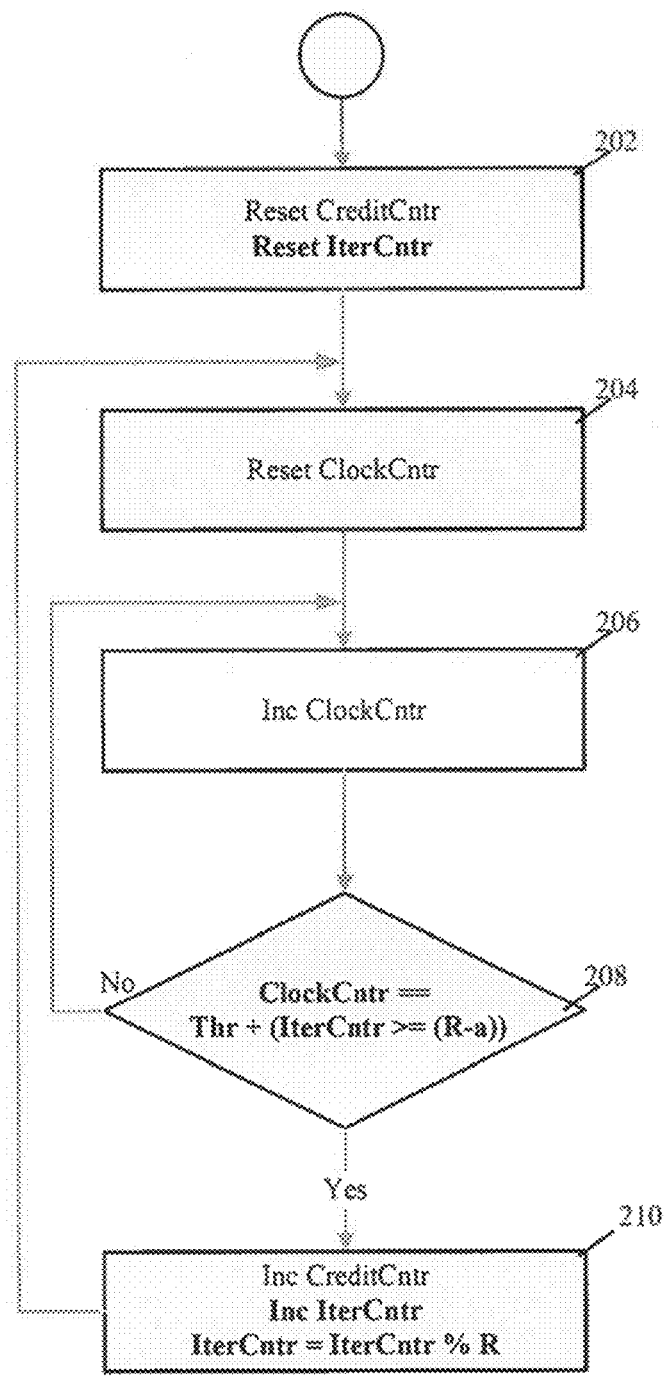
FIG. 2 is a simplified flowchart illustrating a method of utilizing the rate limiter of FIG. 1 according to an embodiment of the present disclosure.

As described above, embodiments of the present disclosure utilize a rate limiter 104 that grants credits to the client 106 according to the configurable threshold (Thr+(A/R)), whereby during a sequence in which R credits are granted to the client 106, (R−A) credits are granted at the first rate (1 credit/Thr clock cycles), and A credits are granted at the second rate (1 credit/(Thr+1) clock cycles). FIG. 2 is a flowchart illustrating an example method that may be utilized by the rate limiter 104 in granting the (R−A) credits and the A credits at the respective first and second rates. In the example of FIG. 2, during the sequence in which R credits are granted to the client 106, the first (R−A) credits granted in the sequence are granted at the first rate, and the following A credits granted in the sequence are granted at the second rate.

At a step 202, the rate limiter 104 resets a credit counter (CreditCntr) to an initial value (e.g., zero). The rate limiter 104 uses the credit counter to maintain a count of a number of credits that have been granted to the client 106. Further, at the step 202, the rate limiter 104 resets an iteration counter (IterCntr) to an initial value. In embodiments, the initial value of the iteration counter is zero. As described above, in embodiments, the rate limiter 104 grants credits to the client 106 in repeatable sequences, where the rate limiter 104 grants R credits to the client 106 during a sequence. In a first iteration of the sequence, the rate limiter 104 grants a first credit of the R credits to the client 106, in a second iteration of the sequence, the rate limiter 104 grants a second credit of the R credits to the client 106, and so on, until an R-th iteration of the sequence occurs, during which the R-th credit of the R credits are granted to the client. The rate limiter 104 uses the iteration counter to maintain a current iteration of the sequence.

In embodiments, the rate limiter 104 initializes the iteration counter to a value of zero at the start of a sequence (i.e., as shown at the step 202 in FIG. 2) and increments the iteration counter in response to the rate limiter 104 granting a credit to the client 106. Further, in embodiments, the rate limiter 104 resets the iteration counter to zero upon the iteration counter reaching the value R. Thus, when the iteration counter has the initial value of zero, this indicates to the rate limiter 104 that it is a first iteration of the sequence, during which the rate limiter 104 grants the first credit of the R credits to the client 106. Likewise, when the iteration counter has a value of (R−1), this indicates to the rate limiter 104 that it is a final (i.e., R-th) iteration of the sequence, during which the R-th credit of the R credits will be granted to the client 106. When the iteration counter has the value R, this indicates to the rate limiter 104 that the sequence is complete (i.e., the rate limiter 104 has granted R credits to the client 106) and that the iteration counter should be reset to zero to begin a new sequence. In embodiments, the rate limiter 104 utilizes the iteration counter in determining whether to grant a credit to the client 106 at the first rate or the second rate. These aspects of the iteration counter are described in further detail below.

At a step 204, the rate limiter 104 resets a clock counter (ClockCntr) to an initial value (e.g., zero). The rate limiter 104 uses the clock counter to maintain a count of a number of clock cycles that have elapsed since the rate limiter 104 last granted a credit to the client 106. For instance, if the rate limiter 104 uses a rate of (1 credit/6 clock cycles) during a given iteration of the sequence, the rate limiter 104 increments the clock counter each clock cycle, and when the clock counter has a value of 6 (i.e., six clock cycles have elapsed since the rate limiter 104 last granted a credit to the client 106), the rate limiter 104 grants a credit to the client 106 and resets the clock counter to the initial value. The rate limiter's incrementing of the clock counter in response to an elapsing of a clock cycle is shown in FIG. 2 at a step 206.

At a step 208, the rate limiter 104 evaluates the following expression:

ClockCntr==Thr+(IterCntr≥(R−A))

If the expression is false, then the method returns to the step 206, and the rate limiter 104 increments the clock counter after another clock cycle has elapsed. If the expression is true, then the method proceeds to a step 210, where the rate limiter 104 grants a credit to the client 106 without requiring any additional clock cycles to elapse.

The portion of the expression (IterCntr≥(R−A)) is equal to "0" (i.e., is false) for values of the iteration counter 0 . . . ((R−A)−1) and is equal to "1" (i.e., true) for values of the iteration counter (R−A) . . . (R−1). Accordingly, it can be seen that for iterations 0 . . . ((R−A)−1) of the sequence, the rate limiter 104 requires the clock counter to reach the value of Thr (i.e., Thr+0) and then grants a credit to the client 106. By contrast, for iterations (R−A) . . . (R−1) of the sequence, the rate limiter 104 requires the clock counter to reach the value of Thr+1, and then grants a credit to the client 106. In other words, the rate limiter 104 grants the first (R−A) credits of the sequence at the first rate of (1 credit/Thr clock cycles) and the following A credits of the sequence are granted at the second rate of (1 credit/(Thr+1) clock cycles).

As described above, if the expression at the step 208 is determined to be true, then the method proceeds to the step 210, where the rate limiter 104 grants a credit to the client 106. Further, at the step 210, the rate limiter 104 increments both the credit counter and the iteration counter. After incrementing the iteration counter, the rate limiter 104 sets the iteration counter according to the following equation:

$$IterCntr=IterCntr \% R.$$

The operator "%" is a modulus operator. When the iteration counter is equal to R, the expression (R % R) is equal to zero, such that the iteration counter is reset to zero. For all other values of the iteration counter, the iteration counter is not reset, and the modulus operation does not change the value of the iteration counter. Thus, when the iteration counter has the value R, this indicates to the rate limiter 104 that the sequence is complete (i.e., the rate limiter 104 has granted R credits to the client 106) and that the iteration counter should be reset to begin a new sequence.

As described above, in the example method of FIG. 2, during the sequence in which the R credits are granted to the client 106, the rate limiter 104 grants the first (R−A) credits of the sequence at the first rate and then grants the following A credits of the sequence at the second rate. In other words, the rate limiter 104 (i) uses the faster rate of (1 credit/Thr clock cycles) in granting the first (R−A) credits, and (ii) uses the slower rate of (1 credit/(Thr+1) clock cycles) in granting the following A credits. The rate limiter 104 thus uses the faster rate at the beginning of the sequence and the slower rate at the end of the sequence. For instance, according to the embodiment of FIG. 2, in a sequence in which R=8 credits are granted and A=2, the rate limiter 104 grants the first 6 credits at the faster rate (1 credit/Thr clock cycles) and the following 2 credits at the slower rate (1 credit/(Thr+1) clock cycles).

In some instances, it may be desirable for the rate limiter 104 to use a different distribution of the first and second rates. Rather than using the faster rate exclusively at the beginning of the sequence and the slower rate exclusively at the end of the sequence, it may be desirable to intersperse usage of the slower and faster rates throughout the sequence, in embodiments. For instance, in the above-described example in which R=8 credits are granted and A=2, it may be desirable to use the slower rate in the fourth and eighth iterations of the sequence, rather than using the slower rate in the seventh and eighth iterations of the sequence. To illustrate an example embodiment in which the use of the first and second rates varies from that of FIG. 2, reference is made to FIGS. 3 and 4.

FIG. 3 illustrates an example data structure indexed by the configurable value A, according to an embodiment of the disclosure. In embodiments, the rate limiter 104 includes a data structure (e.g., a table, vector, etc.) indexed by the configurable value A, and the rate limiter 104 uses this data structure in determining whether to grant a credit at the first rate or the second rate. In particular, as described above, the rate limiter 104 grants credits to the client 106 in repeatable sequences, where a sequence comprises R iterations (e.g., a first of R credits is granted to the client 106 during a first iteration of the sequence, and so on), and the rate limiter 104 uses an iteration counter to maintain a current iteration of the sequence. In embodiments, the rate limiter 104 uses the data structure indexed by the configurable value A, where an entry (e.g., a row) in the data structure associated with a given value of A includes R values. Each of the R values (i) is associated with a respective count value of the iteration counter, and (ii) indicates whether the first rate or the second rate should be used in granting a credit to the client in a given iteration. An entry of the data structure associated with a given value of A includes (R−A) values indicating that a credit should be granted at the first rate and A values indicating that a credit should be granted at the second rate.

The vector of FIG. 3 is an example of this data structure utilized by the rate limiter 104. The example data structure of FIG. 3 is usable in instances where the configurable threshold of the rate limiter 104 has a value of R=8. As seen in the figure, the data structure is indexed by the value A, with each row of the data structure being associated with a given value of A. Each row (e.g., entry) of the data structure includes R values, and each of the R values is associated with a respective count value of the iteration counter IterCntr, as shown in the figure. A value of "0" indicates that for a respective iteration of the sequence, the rate limiter 104 should grant a credit to the client 106 at the faster rate of (1 credit/Thr clock cycles), and a value of "1" indicates that for a respective iteration of the sequence, the rate limiter 104 should grant a credit to the client 106 at the slower rate of (1 credit/(Thr+1) clock cycles). An entry of the data structure associated with a given value of A includes (R−A) values that are equal to "0" and A values that are equal to "1."

To illustrate the rate limiter's use of the example data structure of FIG. 3, consider an example where the configurable threshold (Thr+(A/R)) has values A=2 and R=8. With these values, (R−A) (i.e., 6) of the credits are granted at the faster rate of (1 credit/Thr clock cycles), and A (i.e., 2) of the credits are granted at the slower rate of (1 credit/(Thr+1) clock cycles). In this example, the rate limiter 104 accesses the entry (e.g., the row) of the data structure for A=2. This entry specifies that in iterations having iteration counter values of 0, 1, 2, 4, 5, and 6, the rate limiter 104 should grant a credit to the client 106 at the faster rate of (1 credit/Thr clock cycles). The entry further specifies that in iterations having iteration count values of 3 and 7, the rate limiter 104 should grant a credit to the client 106 at the slower rate of (1 credit/(Thr+1) clock cycles). Thus, by using the entry of the data structure to determine whether to grant credits at the first or second rate, the rate limiter 104 does not utilize the slower rate exclusively at the end of the sequence but instead uses the slower rate at different iterations (i.e., iterations 3 and 7) throughout the sequence.

Figure 4:
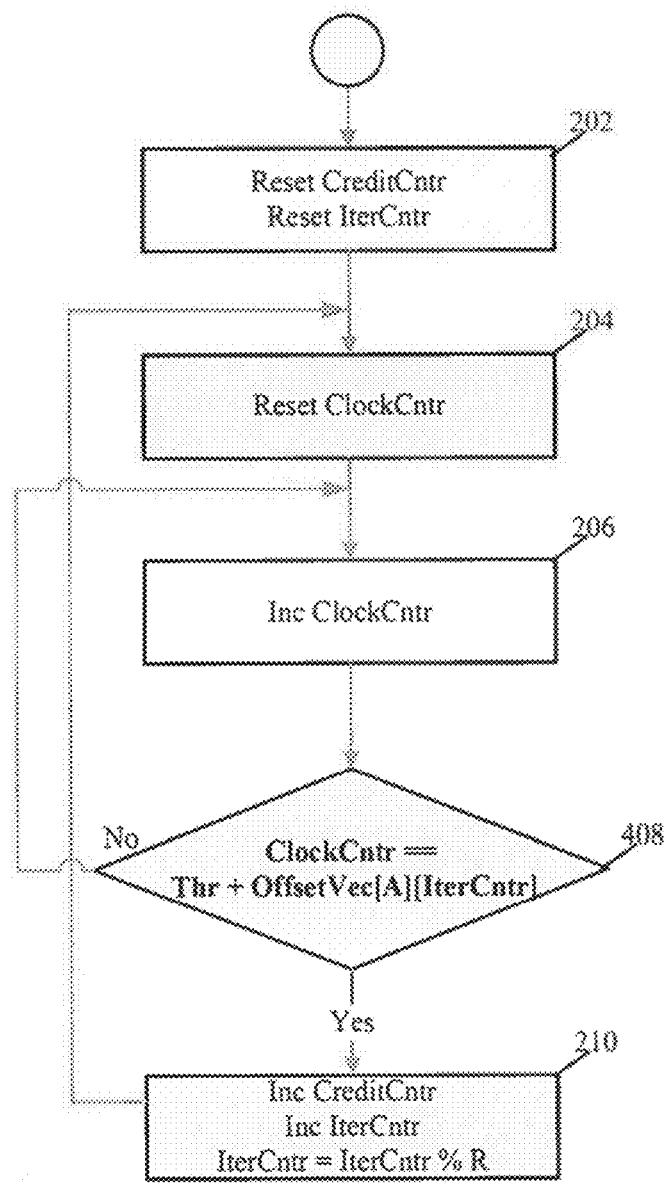
FIG. 4 is a simplified flowchart illustrating another method of utilizing the rate limiter of FIG. 1 according to an embodiment of the present disclosure.

To further illustrate the rate limiter's use of the above-described data structure, reference is made to FIG. 4. This figure depicts a flowchart illustrating an example method that may be utilized by the rate limiter 104. Steps 202, 204, 206, and 210 of the flowchart in FIG. 4 are the same as or similar to those steps described above with reference to FIG. 2, and for brevity, these steps are not described again. At a step 408 shown in FIG. 4, the rate limiter 104 evaluates the following expression:

$$ClockCntr=Thr+OffsetVec[A][IterCntr],$$

where OffsetVec is the above-described data structure indexed by the value A, and the value OffsetVec[A][IterCntr] represents the value of the data structure for a row A and a column equal to a value of the iteration counter IterCntr. Thus, for example, with reference again to FIG. 3, if A=2 and the iteration counter has a value of 3, the value OffsetVec[A=2][IterCntr=3] is equal to "1," as shown at row A=2 and column IterCntr=3. Conversely, for example, if the iteration counter has a value of 4, the value OffsetVec[A=2][IterCntr=4] is equal to "0," as shown at row A=2 and column IterCntr=4. If the above expression is evaluated to be false, then the method returns to the step 206, and the rate limiter 104 increments the clock counter after another clock cycle has elapsed. If the expression is true, then the method proceeds to the step 210, where the rate limiter 104 grants a credit to the client 106 without requiring any additional clock cycles to elapse.

In the example of FIG. 4, the rate limiter 104 determines, for a given iteration of the sequence, whether the clock counter must reach a value of Thr or Thr+1 before granting a credit to the client 106, with this determination being made based on a value stored in the above-described data structure. In the example of FIGS. 3 and 4, if A=2 and R=8, the data structure specifies that in iterations 0, 1, 2, 4, 5, and 6 of the sequence, the rate limiter 104 should require the clock counter to reach the value of Thr (i.e., Thr+0) and then grant a credit to the client 106. By contrast, for iterations 3 and 7 of the sequence, the data structure specifies that the rate limiter 104 should require the clock counter to reach the value of Thr+1 and then grant a credit to the client 106. In other words, in the iterations 0, 1, 2, 4, 5, and 6 of the sequence, the rate limiter 104 grants credits to the client 106 at the first rate of (1 credit/Thr clock cycles), and in the iterations 3 and 7, the rate limiter 104 grants credits to the client 106 at the second rate of (1 credit/(Thr+1) clock cycles).

It is noted that the data structure shown in FIG. 3 is only an example. The example of FIG. 3 is usable in instances where the configurable threshold (Thr+(A/R)) of the rate limiter 104 has a value R=8. As described above, in embodiments, A<R, such that the example data structure of FIG. 3 includes entries for A=0 . . . 7. As is also described above, the iteration counter counts between values of IterCntr=0 . . . (R−1) before being reset when IterCntr=R, such that the example data structure of FIG. 3 includes entries for IterCntr=0 . . . 7. It is noted that the data structure includes R*R values to accommodate the different combinations of A and IterCntr that are possible.

In examples, the rate limiter 104 generates the above-described data structure automatically, via an algorithmic process implemented in hardware and/or software that requires no human intervention or little human intervention. Specifically, in embodiments, for given values of A and R of the configurable threshold (Thr+(A/R)), the rate limiter 104 generates an entry (e.g., a row) of the data structure for the value of A according to the following pseudocode.

ratio=A/R;
  data_structure[0]=0;
  sum_1=0;
  for (i=1 . . . (R−1))
  {
    if(((sum_1+1)/(i+1))>ratio)
    // Predict, if adding 1, will rate be slower
    // than needed?
      then data_structure[i]=0;
    else
      data_structure[i]=1;
      sum_1=sum_1+1;
  }

In embodiments, the pseudocode minimizes sequences of zeros in a given entry, which reduces an amount of error present. In embodiments, error is defined as the difference between a read using the rate limiter 104 and a read from an ideal rate limiter (i.e., a rate limiter that can read at a rate corresponding to the ideal threshold of the rate limiter). Relatively long sequences of zeros in a given entry are undesirable, in embodiments, because this means that the rate limiter 104 will grant credits to the client 106 in a manner that enables the client 106 to perform many reads that are executed before their ideal time, which may cause a relatively large accumulated error. In embodiments, shortening sequences of zeros in a given entry reduces this accumulated error.

In granting a credit to the client, a rate at which the credit is granted should be greater than (A/R) but should exceed this value by as small an amount as is possible. If the rate at which the credit is granted is lower than the rate corresponding to (A/R), there is a risk of an underrun condition occurring, as described above. Accordingly, in the pseudocode above, a variable "ratio" equal to (A/R) is defined, and this variable is used in the pseudocode to ensure that these conditions are met. A value of the entry of the data structure for IterCntr=0 is always equal to zero, as shown in the line of pseudocode "data_structure[0]=0." A variable "sum_1" maintains a count of the number of 1's in the entry of the data structure during the generation of the entry. The entry, at the completion of the pseudocode, (i) should include the value "1" a total of A times, and (ii) should include the value "0" a total of (R−A) times, as described above.

The pseudocode further includes a "for" loop for indices i=1 . . . (R−1), where the value i represents different values of the iteration counter iterCntr. In the "for" loop, for each of the indices i=1 . . . (R−1), a prediction is made as to whether adding the value "1" for the given index value will cause the rate to be slower than the ratio (A/R). This prediction is made via the "if" statement shown above. If the "if" statement is true, then the value "1" is not used for the given index value, as seen in the line "then data_structure [i]=0." Conversely, if the "if" statement is false, then the value "1" is used for the given index value, as seen in the line "data_structure[i]=1." Because a value of "1" has been added to the data structure, the "sum_1" variable must be incremented, as shown in the line "sum_1=sum_1+1."

In embodiments described above, the rate limiter 104 grants credits to the client 106 in sequences in which R credits are granted to the client. As described above, the sequence comprises R iterations, and during each iteration, a single credit is granted to the client 106 at the first rate of (1 credit/Thr clock cycles) or the second rate of (1 credit/(Thr+1) clock cycles). It is noted, however, that in other embodiments, the rate limiter 104 grants more than one credit to the client 106 at a time. In these other embodiments, the rate limiter 104 still grants credits in sequences having R iterations. In (R−A) iterations, the rate limiter 104 grants the multiple credits to the client 106 at a rate that is proportional to (1/Thr), and in A iterations, the rate limiter 104 grants the multiple credits to the client 106 at a rate that is proportional to (1/(Thr+1)). Thus, for instance, in embodiments where the rate limiter 104 is configured to grant 2 credits to the client 106 at a time, during a given sequence including R iterations, in (R−A) iterations, the rate limiter 104 grants the two credits to the client 106 at a rate equal to (2 credits/Thr clock cycles), and in A iterations, the rate limiter 104 grants the two credits to the client 106 at a rate that is equal to (2 credits/(Thr+1) clock cycles).

In embodiments, the rate limiter 104 is implemented by dedicated hardware, such as an application-specific integrated circuit (ASIC). In some of these embodiments, the resolution R of the rate limiter 104 is a constant of the hardware, while the values A and Thr are configurable inputs to the hardware (e.g., provided via a user, via software executed on the network device 102, etc.). In other embodiments, the rate limiter 104 is implemented using a general purpose processor. In some embodiments, the rate limiter 104 forms a portion of a network device, such as a switch device, that includes a packet processing pipeline comprising a plurality of dedicated ASIC processing engines. The rate limiter 104 includes one or more storage devices (e.g., registers, memories, counters, etc.), in embodiments, for storing one or more of the values A, Thr, and R, the data structure (e.g., offset vector), and the counter values described above.

Figure 5:
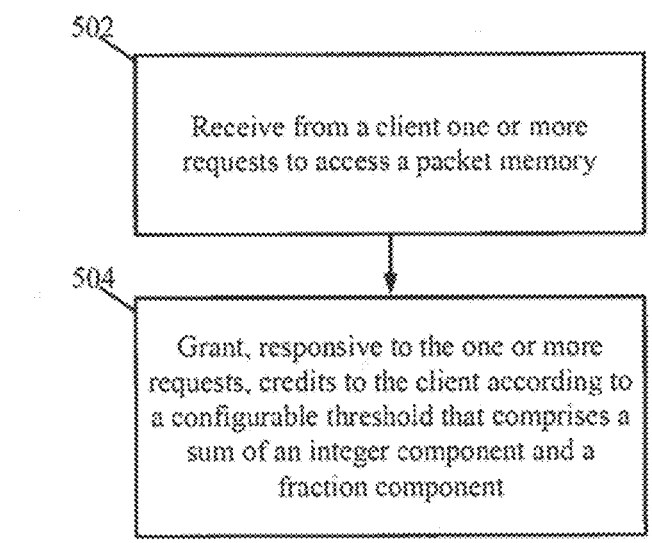
FIG. 5 is a flowchart depicting steps of an example method of constraining a client's access to a packet memory of a network device according to an embodiment of the present disclosure.

FIG. 5 is a flowchart depicting steps of an example method of constraining a client's access to a packet memory of a network device according to an embodiment of the present disclosure. FIG. 5 is described with reference to FIG. 1 above for ease of understanding. But the process of FIG. 5 is applicable to other hardware arrangements as well. At 502, one or more requests to access a packet memory (e.g., a packet memory 108) of a network device (e.g., a network device 102) are received from a client (e.g., a client 106). In the hardware arrangement of FIG. 1, the one or more requests are received at the rate limiter 104. The client is configured to access the packet memory based on its receipt of a credit. At 504, responsive to the one or more requests, credits are granted to the client according to a configurable threshold. In the hardware arrangement of FIG. 1, the rate limiter 104 grants the credits to the client 106 according to the configurable threshold. The configurable threshold comprises a sum of an integer component and a fraction component, where the sum defines an average rate at which the credits are granted to the client. It is noted that in embodiments, some of the steps 502, 504 of FIG. 5 are performed simultaneously and not necessarily sequentially, and that in embodiments, the ordering of the steps 502, 504 varies from that depicted in the figure.

This application uses examples to illustrate the invention. The patentable scope of the invention may include other examples.

What is claimed is:

1. A network device comprising:
a packet memory configured to store packets;
a client configured to transmit a request to access the packet memory;
a rate limiter configured to receive the request from the client, and in response to receiving the request, grant credits to the client according to a configurable threshold, wherein
the configurable threshold defines an average rate at which the credits are granted to the client by the rate limiter, and comprises a sum of an integer component comprising an integer value Thr that defines first and second rates at which credits are granted to the client by the rate limiter during a sequence in which a predetermined number of credits are granted to the client and a fraction component comprising a configurable numerator value A and a configurable denominator value R;
the rate limiter includes a counter having a count that is initialized at zero and incremented in response to the rate limiter granting a credit to the client, the count being reset to zero upon reaching the value R, and a data structure indexed by the value A, wherein an entry in the data structure associated with a given value of A includes R values, each of the R values (i) being associated with a respective count, and (ii) indicating whether the first rate or the second rate should be used in granting the credit to the client;
the rate limiter determines whether to grant a credit at the first rate or the second rate based on the entry of the data structure associated with the value A and the count; and
an entry in the data structure associated with a given value of A includes (R−A) values indicating that a credit should be granted at the first rate and A values indicating that a credit should be granted at the second rate;
the client being configured to, in response to receiving credits from the rate limiter, access the packet memory based on the granted credits; and
a network port configured to receive packets from the client.

2. The network device of claim 1, wherein the configurable denominator value defines a resolution at which the configurable threshold can be set.

3. The network device of claim 2, wherein the configurable threshold is $$\left(Thr + \frac{A}{R}\right),$$

and for a given resolution R, the values Thr and A satisfy $$Thr + \frac{A}{R} \le IdealThr < Thr + \frac{A+1}{R},$$

where IdealThr defines an ideal rate for granting credits to the client, and A<R.

4. The network device of claim 1,
wherein the predetermined number is equal to the value R;
wherein the first rate is proportional to $$\frac{1}{Thr}$$

and the second rate is proportional to $$\frac{1}{Thr+1};$$

wherein the number of credits that are granted at the first rate is equal to (R−A); and
wherein the number of credits that are granted at the second rate is equal to A.

5. The network device of claim 4, wherein during the sequence in which the R credits are granted to the client, the first (R−A) credits granted in the sequence are granted at the first rate, and the following A credits granted in the sequence are granted at the second rate.

6. An apparatus comprising:
a client that is configured to access or utilize a resource based on the client receiving a credit; and
a rate limiter configured to grant credits to the client according to a configurable threshold, wherein
the configurable threshold defines an average rate at which the credits are granted to the client by the rate limiter, and comprises a sum of an integer component comprising an integer value Thr that defines first and second rates at which credits are granted to the client by the rate limiter during a sequence in which a predetermined number of credits are granted to the client and a fraction component comprising a configurable numerator value A and a configurable denominator value R;

the rate limiter includes a counter having a count that is initialized at zero and incremented in response to the rate limiter granting a credit to the client, the count being reset to zero upon reaching the value R, and a data structure indexed by the value A, wherein an entry in the data structure associated with a given value of A includes R values, each of the R values (i) being associated with a respective count, and (ii) indicating whether the first rate or the second rate should be used in granting the credit to the client;

the rate limiter determines whether to grant a credit at the first rate or the second rate based on the entry of the data structure associated with the value A and the count; and an entry in the data structure associated with a given value of A includes (R−A) values indicating that a credit should be granted at the first rate and A values indicating that a credit should be granted at the second rate.

7. The method of claim 6, wherein the predetermined number is equal to the value R;

wherein the first rate is proportional to $$\frac{1}{Thr}$$

and the second rate is proportional to $$\frac{1}{Thr+1};$$

wherein the number of credits that are granted at the first rate is equal to (R−A); and wherein the number of credits that are granted at the second rate is equal to A.

8. The method of claim 7, further comprising:

granting the first (R−A) credits in the sequence at the first rate; and granting the following A credits in the sequence at the second rate.

9. A method of constraining a client's access to a packet memory of a network device, the method comprising:

receiving from a client one or more requests to access a packet memory of a network device;

granting, responsive to the one or more requests, credits to the client according to a configurable threshold, the configurable threshold defining an average rate at which the credits are granted to the client by the rate limiter, and comprising a sum of an integer component comprising an integer value Thr that defines first and second rates at which credits are granted to the client by the rate limiter during a sequence in which a predetermined number of credits are granted to the client and a fraction component comprising a configurable numerator value A and a configurable denominator value R; wherein during a sequence in which a predetermined number of credits equal to the value R are granted to the client:
initializing a counter to a count of zero;
incrementing the count in response to a granting of a credit to the client;
resetting the count to zero upon reaching the value R; and
accessing a data structure indexed by the value A to determine whether to grant a credit at the first rate or the second rate, wherein an entry in the data structure associated with a given value of A includes R values, each of the R values (i) being associated with a count, and (ii) indicating whether the first rate or the second rate should be used in granting a credit to the client; and
wherein an entry in the data structure associated with a given value of A includes (R−A) values indicating that a credit should be granted at the first rate and A values indicating that a credit should be granted at the second rate; and accessing by the client, responsive to receiving credits, the packet memory based on the granted credits.

10. The method of claim 9, wherein the fraction defines a resolution at which the configurable threshold can be set.

11. The method of claim 10, wherein the configurable threshold is $$Thr + \left(\frac{A}{R}\right),$$

the method further comprising:

for a given resolution R, selecting the values Thr and A to satisfy $$Thr + \frac{A}{R} \leq IdealThr < Thr + \frac{A+1}{R},$$

where IdealThr defines an ideal rate for granting credits to the client, and A<R.

* * * * *